US008883879B2

(12) United States Patent
Rathschlag et al.

(10) Patent No.: US 8,883,879 B2
(45) Date of Patent: *Nov. 11, 2014

(54) PIGMENT GRANULES

(75) Inventors: Thomas Rathschlag, Riedstadt (DE); Carsten Griessmann, Gross-Zimmern (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/141,529

(22) PCT Filed: Dec. 18, 2009

(86) PCT No.: PCT/EP2009/009101
§ 371 (c)(1),
(2), (4) Date: Aug. 8, 2011

(87) PCT Pub. No.: WO2010/072376
PCT Pub. Date: Jul. 1, 2010

(65) Prior Publication Data
US 2011/0301273 A1    Dec. 8, 2011

(30) Foreign Application Priority Data
Dec. 22, 2008  (DE) .................. 10 2008 064 201

(51) Int. Cl.
| C08K 9/00 | (2006.01) |
| C09D 5/29 | (2006.01) |
| C09C 1/00 | (2006.01) |
| C09C 3/04 | (2006.01) |
| C09D 5/03 | (2006.01) |
| C09D 5/36 | (2006.01) |

(52) U.S. Cl.
CPC ....... C09C 1/0024 (2013.01); C09C 2200/1004 (2013.01); C09C 2200/102 (2013.01); C09C 2200/302 (2013.01); C09C 3/045 (2013.01); C09C 2200/1054 (2013.01); C01P 2004/61 (2013.01); C09D 5/032 (2013.01); C09C 1/0081 (2013.01); C09C 2200/301 (2013.01); C09D 5/36 (2013.01)
USPC ........... 523/200; 523/171; 524/107; 524/323; 524/414; 524/585

(58) Field of Classification Search
USPC ........... 523/171, 200; 524/107, 323, 414, 585
See application file for complete search history.

(56) References Cited

U.S. PATENT DOCUMENTS

| 3,087,828 A * | 4/1963 | Linton ................... 106/417 |
| 4,116,628 A | 9/1978 | Hesse |
| 4,247,650 A * | 1/1981 | Shimizu et al. ............. 521/143 |
| 4,482,389 A | 11/1984 | Franz |
| 4,490,179 A | 12/1984 | Bernhard |
| 4,494,993 A | 1/1985 | Bernhard |
| 4,544,415 A | 10/1985 | Franz |
| 5,393,714 A | 2/1995 | Thometzek |
| 5,455,288 A * | 10/1995 | Needham ................. 523/205 |
| 5,571,851 A | 11/1996 | Freeman |
| 5,688,449 A * | 11/1997 | Fox ................... 264/54 |
| 5,759,255 A | 6/1998 | Venturini |
| 6,120,899 A * | 9/2000 | Cameron et al. ........... 428/407 |
| 6,451,102 B1 | 9/2002 | Hilder |
| 6,761,762 B1 | 7/2004 | Greiwe |
| 6,866,710 B2 * | 3/2005 | Heider et al. .............. 106/403 |
| 2002/0098435 A1 | 7/2002 | Rohr |
| 2003/0176536 A1 * | 9/2003 | Rathschlag et al. ......... 523/171 |
| 2004/0043147 A1 * | 3/2004 | Findley .................... 427/212 |
| 2005/0143493 A1 | 6/2005 | Kieser |
| 2006/0223932 A1 * | 10/2006 | Kieser et al. ............. 524/449 |
| 2007/0022907 A1 | 2/2007 | Becker |
| 2010/0179256 A1 | 7/2010 | Kling |
| 2011/0251303 A1 * | 10/2011 | Rathschlag et al. ........ 523/171 |

FOREIGN PATENT DOCUMENTS

| DE | 2215191 | 10/1972 |
| DE | 2603211 | 8/1977 |
| DE | 3151354 | 7/1983 |
| DE | 3235017 | 3/1984 |
| DE | 3334598 | 4/1985 |
| DE | 102006039913 | 2/2008 |
| EP | 0090259 | 10/1983 |
| EP | 0606592 | 7/1994 |

(Continued)

OTHER PUBLICATIONS

"Precision Molded Foam Conversion Chart." Tempo can produce beads in these ranges using corresponding mechanical screens. Retrieved online Nov. 1, 2011. Retrieved from Internet<http://ww.www.tempo_foam.com/engineering/conversion_charts>.*

(Continued)

*Primary Examiner* — Hannah Pak
(74) *Attorney, Agent, or Firm* — RatnerPrestia

(57) ABSTRACT

Pigment granules including a support material which is coated with one or more flake-form effect pigments by means of an adhesion promoter. The effect pigments may be, for example, pearlescent pigments, interference pigments, metal-effect pigments, multilayered pigments having one or more transparent, semi-transparent or opaque layers, goniochromatic pigments, holographic pigments, coated BiOCl flakes, uncoated BiOCl flakes, and LCP pigments, and mixtures thereof. A process for the production of pigment granules includes mixing one or more flake-form effect pigments, a support material, at least one adhesion promoter, and optionally one or more additives simultaneously or successively with one another. The pigment granules may be used for the pigmenting of application media, in particular paints, plasters, coatings, powder coatings, plastics, and in particular as scatter and effect granules, for example for the decoration of wallcoverings. The pigment granules may additionally include one or more additives and assistants.

14 Claims, No Drawings

(56) References Cited

FOREIGN PATENT DOCUMENTS

| | | |
|---|---|---|
| EP | 0634459 | 1/1995 |
| EP | 1520876 | 4/2005 |
| GB | 1348878 | 3/1974 |
| WO | 9632446 | 10/1996 |
| WO | 9957204 | 11/1999 |
| WO | 0192425 | 12/2001 |
| WO | 2005019327 | 3/2005 |
| WO | 2005052076 | 6/2005 |

OTHER PUBLICATIONS

International Search Report for WO2010/072376, mailed Feb. 24, 2010.

* cited by examiner

PIGMENT GRANULES

CROSS-REFERENCE TO RELATED APPLICATIONS

This application is a United States national phase application of International Application No. PCT/EP2009/009101, filed Dec. 18, 2009, which claims priority of DE102008064201.0, filed Dec. 22, 2008, which applications are incorporated herein by reference in their entirety for all purposes.

FIELD OF THE INVENTION

The present invention relates to non-dusting pigment granules based on a support coated with one or more flake-form effect pigments, and to the use thereof for the pigmenting of application media, in particular paints, plasters, coatings, powder coatings, plastics, and as scatter granules, for example for the decoration of wallcoverings.

BACKGROUND OF THE INVENTION

The flow behaviour of pigments based on flake-form substrates, such as, for example, mica flakes, is frequently unsatisfactory. In a multiplicity of applications, in particular in the printing and inks sector, this does not result in major problems. In addition, pronounced development of dust occurs in the processing of pearlescent pigments, which requires increased equipment complexity for the elimination of the dusts and for cleaning the machines.

The production of pigment granules using inorganic or organic pigments is known to the person skilled in the art. Colour masterbatches having pigment proportions of 20-50% by weight are used for colouring diverse plastic systems. This is usually a two-step process as far as production of the final granules.

The wetting of plastics, such as, for example, nonpolar thermoplastics based on polyolefins, such as, for example, polyethylene, polypropylene, without pretreatment methods, such as, for example, corona discharge or flame treatment, in subsequent coating with aqueous adhesion promoters often results in poor laminate adhesion to the substrate to be coated. This phenomenon is particularly pronounced in the case of the coating of plastic-based supports with flake-form particles. In general, the mechanical properties of the coated substrates are deficient, which is evident, in particular, in the form of abrasion dust and loss of adhesion of the coloured coating from the support substrate in the form of delamination.

Support particles based on glass often require silanisation in order to ensure durable coatings with a flake-form effect pigment with corresponding adhesion to the surface.

SUMMARY OF THE INVENTION

In at least one embodiment, the present invention provides pigment granules having supports comprising plastics, preferably polyolefins, and/or glass, which do not require additional pre-treatment methods and at the same time do not have the above-mentioned disadvantages of the prior art.

Surprisingly, it has now been found that pigment granules based on a support material, such as, for example, polymer particles, glass beads or hollow glass beads, or mixtures thereof, which is coated with one or more flake-form effect pigments are very highly suitable for economical and durable permanent coating.

Embodiments of the present invention therefore relate to pigment granules based on a support material which has been coated with one or more flake-form effect pigments by means of an adhesion promoter. The effect pigment here is preferably bonded to the support, for example a polymer particle, a glass bead or hollow glass bead, on the surface or partially or completely coated therewith.

The present invention furthermore describes a one-step process for the production of the pigment granules according to the invention, which is based on direct coating of the support materials, where the proportion of effect pigments on the support surface is generally <50% by weight. Since the process according to the invention is not tied to a thermoplastic or thermosetting support material, but is instead a support-independent process, this process can also be regarded as particularly economical.

The present invention furthermore also relates to a process for the production of the pigment granules according to the invention in which one or more flake-form effect pigments, at least one adhesion promoter and optionally additives are mixed with the support material.

The pigment granules according to the invention are particularly suitable for use as scatter granules for effect wallcoverings, for textured plaster systems and textile coatings.

The pigment granules according to the invention are non-dusting and very readily flowable, which reduces the equipment complexity for their processing.

DETAILED DESCRIPTION OF THE INVENTION

Besides the effect pigment, an essential constituent of the pigment granules according to the invention is the support material. A suitable support material should have, in particular, high transparency. Transparent supports, such as, for example, plastic particles, glass beads and hollow glass beads, support the optical properties, for example the pearlescence or metal sheen, of the effect pigments applied to the surface by means of their transparency to light.

In this application, the measure used for the transparency to light is the degree of transparency $$\zeta (\text{i.e., tau}) = \phi_n / \phi_T \times 100 (\%)$$

in accordance with DIN 1349-1.

The support materials are in the form of individual particles, which are preferably spherical. The support material preferably has particle sizes of 0.05-50 mm, in particular 0.6-10 mm and very particularly preferably 0.5-5 mm. The particle sizes in this patent application are determined in accordance with DIN 66165 Part 2. Suitable support materials are preferably polymer particles, solid glass beads and hollow glass beads.

The polymer particles used are preferably those made from plastic(s), such as, for example, thermoplastics or thermosets. The polymer particles preferably consist of polyolefins, in particular of polyethylene (PE) and polypropylene (PP), polystyrene (PS), polymethyl methacrylate (PMMA), polyethylene terephthalate (PET), polycarbonate (PC), polyvinyl acetate copolymer (PVAC), polyvinyl chloride (PVC), ethylene-acrylic acid copolymer (EAA), ethylene-vinyl acetate copolymer or biodegradable polyester, for example polylactic acid (polylactide or PLA).

Particularly preferred support materials consist of EAA (ethylene-acrylic acid copolymer), for example obtainable from ExxonMobil under the trade name Escor™, or EVA (ethylene-vinyl acetate copolymer), for example Evatane® 24-03 from ARKEMA, or of polyvinyl acetate (PVAC), for example Vinnaperl 10 or Vinnaperl 20 from Wacker Chemie.

The support material is preferably spherical. It preferably has a particle size of 0.05-50 mm, in particular 0.5-10 mm, very particularly preferably 0.5-5 mm.

The commercially available plastic powders or plastic granules frequently have particle sizes of 1-5 mm. These polymer particles must then be melted in advance of their use in the production of the pigment granules according to the invention and then adjusted to the desired particle size and shape, for example by granulation, for example underwater granulation, and adjustment of the particle size, for example by means of a perforated disc.

Particular preference is given to the use of spherical microgranules of 0.5-1 mm which consist of LD-PE (low-density polyethylene) or HD-PE (high-density polyethylene), as produced, for example, by Geerkens Rohstoffe GmbH, Willich (FRG).

If the pigment granules according to the invention are employed for the rotational moulding process, the polymer particles are preferably spherical and have a particle size of 0.05-5 mm, in particular 0.05-2 mm, very particularly preferably 0.05-1 mm. It is likewise possible to use unstructured particles of the same particle-size distribution.

The rotational moulding process here is taken to mean the production of plastic hollowware by rotational spinning using a biaxial rotational movement.

The support material used can likewise be solid glass beads or hollow glass beads, which preferably have particle sizes of 0.3-50 mm, in particular 0.5-10 mm, very particularly preferably 0.5-5 mm. Glass beads of this type are commercially available, for example from Sovitec GmbH.

The glass beads should be chemically resistant, depending on the area of application. Preference is given to the use of glass beads or hollow glass beads made from soda-lime glass (principal constituents: $SiO_2/CaO/Na_2O$), ECR glass, C glass, borosilicate glass or quartz.

It is also possible to use mixtures of different support materials, such as, for example,
  solid glass beads+hollow glass beads,
  solid glass beads+thermoplastics,
  solid glass beads+thermosets,
  thermoplastics+thermosets+solid glass beads,
  hollow glass beads+thermoplastics,
  hollow glass beads+thermosets,
  thermoplastics+thermosets+hollow glass beads,
  thermoplastics+thermosets.

All conceivable mixing ratios can be used here; the support materials are preferably mixed in such a way that physical and chemical properties, such as adhesion in the application medium and chemicals resistance, correlate with aesthetic effects and economic considerations.

The support material mixtures are preferably two-component mixtures, which can be mixed with one another in any ratio. The ratio is preferably 1:1 to 1:10 or 10:1.

Furthermore, thermoplastic particles to which blowing agents have been added can also be employed as support material if they are capable of forming three-dimensional structures. Pigment granules on support materials of this type can be used, in particular, in the design of textured wallcoverings.

Suitable adhesion promoters are preferably those which dry physically. The adhesion promoters used are particularly preferably aqueous emulsions, preferably EAA emulsions (ethylene-acrylic acid copolymers), which are commercially available, for example, from Michelman under the name "Michem Prime 4983 R", and emulsions and dispersions based on acrylated polypropylenes or low-chlorinated polypropylenes. Emulsions and dispersions of this type are commercially available, for example from Tramaco under the name "Trapylen 9310 W" and "Trapylen 6700 W".

The size of the EAA emulsion particles is preferably 20-300 nm. The EAA emulsions preferably used preferably consist of 65-85 parts of water and 15-35 parts of EAA.

The size of the acrylated polypropylene or low-chlorinated polypropylene emulsion particles or dispersion particles is preferably 50-5000 nm.

Suitable adhesion promoters are furthermore wax emulsions, which are commercially available, for example, from KEIM ADDITEC Surface GmbH. Suitable wax emulsions are, for example, LD-PE wax emulsions (LD-PE=low-density polyethylene), for example Ultralube V-06070480 from KEIM ADDITEC Surface GmbH. The wax emulsions preferably comprise emulsion particles having a size of 20-100 nm. The suitable wax emulsions preferably have a melting range of 50-160° C., in particular 90-140° C. and very particularly preferably 90-130° C.

Further suitable adhesion promoters which are based on aqueous dispersions are mentioned below, such as, for example, those
  1) Based on Copolymers or Based on Terpolymers:
  vinyl acetate (VAC)/(ethylene) [E]=VAC/E
  vinyl acetate (VAC)/(ethylene) [E]/vinyl chloride (VC)= VAC/E/VC
  vinyl chloride (VC)/ethylene [E]/acrylate (AY)=VC/E/AY
  vinyl chloride (VC)/ethylene [E]/vinyl laurate (VL)=VC/E/VL
  vinyl acetate (VAC)/(ethylene) [E]/vinyl chloride (VC)= VAC/E/VC
  2) Based on Acrylate Dispersions:
  styrene-acrylate (S-AY)
  acrylate (AY)
  self-crosslinking acrylate
  polyacrylates and copolymers thereof
  PMMA and copolymers thereof
  3) Dispersions Based on the Composition:
  Versatic acid vinyl ester (VeoVa)/acrylate (AY)=VeoVa/AY
  ethylene copolymer/acrylate=e-copol./AY
  aqueous polyvinylbutyral dispersions=PVB
  aqueous polyvinyl propionate dispersions=PVP
  water-dilutable urea resins
  water-dilutable polyesters
  water-dilutable alkyd resins
  water-dilutable colophony resins and colophony resin esters
  water-dilutable shellac
  water-dilutable polyvinyl acetals
  water-dilutable polyvinyl ethers
  water-dilutable soya proteins
  polyvinyl alcohols=PVOH
  4) Polyurethane Dispersions
  4a) Aliphatic Polyurethanes
  polyether (PE)/polyurethane (PU)=PE/PU
  polyester (PES)/polyurethane (PU)=PES/PU
  polycarbonate (PC)/polyurethane (PU)=PC/PU
  polyester (PES)/polycarbonate (PC)/polyurethane (PU)= PES/PC/PU
  4b) Aliphatic Oil-based Polyurethane Hybrids
  based on castor oil (CO)
  based on castor oil and linseed oil (LO)

Suitable adhesion promoters are furthermore adhesives based on resins and polymers which can be diluted with organic solvents or are soluble therein. Examples of suitable raw materials are given, for example, in Lackrohstofftabellen

[Coating Raw Materials Tables], Vincentz-Verlag, 10th Edition, 2000 edition, pages 62-622.

Examples of possible adhesives based on resins and polymers are given below:
- saturated polyesters
- unsaturated polyesters
- epoxides
- polyacrylates and copolymers
- PMMA and PMMA copolymers
- polyamides
- ketone resins and aldehyde resins
- polystyrenes
- polyurethanes (PU)
- polyurethanes (PU)/acrylates (AY)=(PU/AY)
- moisture-curable polyurethanes
- PVC
- polyvinyl acetates
- polyvinyl acetals
- polyvinyl ethers
- alkyd/melamine
- urea resins
- polyvinylbutyral=PVB
- polyvinyl propionate=PVP
- urea resins
- polyester resins
- alkyd resins
- colophony resins and colophony resin esters
- shellac The adhesives which can be employed as adhesion promoters are divided in accordance with the solidification mechanism into:
1. Polymerisation adhesives, such as, for example,
   cyanoacrylate (CY-AY)
   MMA adhesives (MMA=methyl methacrylate)
   anaerobically curing adhesives
   radiation-curing adhesives
2. Polycondensation adhesives, such as, for example,
   phenol-formaldehyde adhesives
   silicone adhesives
   silane-crosslinking polymer adhesives
   polyimide adhesives
3. Polyaddition adhesives, such as, for example,
   epoxy resin adhesives
   polyurethane adhesives
4. Hot-melt adhesives, such as, for example,
   moisture-reactive amorphous poly-alpha-olefin hot-melt adhesive=1C APAO.

The proportion of adhesion promoter in the pigment granules according to the invention is preferably 0.05-20% by weight, in particular 0.1-10% by weight, very particularly preferably 0.15-5% by weight, based on the total weight of the pigment granules.

In the pigment granules according to the invention, the effect pigments, the support material and the adhesion promoter and any additives are in the form of a mixture with one another. The support material is preferably at least partially or completely coated or sheathed with the effect pigment by the emulsion. Complete sheathing and "bonding" of the support material with the flake-form effect pigment is very particularly preferred.

The flake-form effect pigments are preferably pearlescent pigments, interference pigments, metal-effect pigments, multilayered pigments having transparent, semi-transparent and/or opaque layers, holographic pigments, coated or uncoated BiOCl pigments and/or LCP pigments.

Pearlescent pigments, interference pigments, metal-effect pigments or multilayered pigments having transparent, semi-transparent and/or opaque layers which can be employed in accordance with the present invention are based, in particular, on supports, where these are preferably in flake form. For example, flake-form $TiO_2$, kaolin, talc, synthetic (for example fluorophlogopite) or natural mica, doped or undoped glass flakes, metal flakes, flake-form $SiO_2$, flake-form $Al_2O_3$ or flake-form iron oxide are suitable. The metal flakes can consist, inter alia, of aluminium, titanium, bronze, steel or silver, preferably aluminium and/or titanium. The metal flakes here may have been passivated by corresponding treatment. The glass flakes can consist of all types of glass known to the person skilled in the art, for example of A glass, E glass, C glass, ECR glass, used glass, window glass, borosilicate glass, Duran® glass, laboratory equipment glass or optical glass. The refractive index of the glass flakes is preferably 1.45-1.80, in particular 1.50-1.70. The glass substrates particularly preferably consist of C glass, ECR glass or borosilicate glass.

In a preferred embodiment, the support of the effect pigment can be coated with one or more transparent, semi-transparent and/or opaque layers comprising metal oxides, metal oxide hydrates, metal suboxides, metals, metal fluorides, metal nitrides, metal oxynitrides or mixtures of these materials. The metal oxide, metal oxide hydrate, metal suboxide, metal, metal fluoride, metal nitride, metal oxynitride layers or the mixtures thereof can be of low refractive index (refractive index <1.8) or high refractive index (refractive index ≥1.8). Suitable metal oxides and metal oxide hydrates are all metal oxides or metal oxide hydrates known to the person skilled in the art, such as, for example, aluminium oxide, aluminium oxide hydrate, silicon oxide, silicon oxide hydrate, iron oxide, tin oxide, cerium oxide, zinc oxide, zirconium oxide, chromium oxide, titanium oxide, in particular titanium dioxide, titanium oxide hydrate and mixtures thereof, such as, for example, ilmenite or pseudobrookite. Metal suboxides which can be employed are, for example, the titanium suboxides. Suitable metals are, for example, chromium, aluminium, nickel, silver, gold, titanium, copper or alloys, and a suitable metal fluoride is, for example, magnesium fluoride. Metal nitrides or metal oxynitrides which can be employed are, for example, the nitrides or oxynitrides of the metals titanium, zirconium and/or tantalum. Metal oxide, metal, metal fluoride and/or metal oxide hydrate layers and very particularly preferably metal oxide and/or metal oxide hydrate layers are preferably applied to the support. Furthermore, multilayered structures comprising high- and low-refractive-index metal oxide, metal oxide hydrate, metal or metal fluoride layers may be present, where high- and low-refractive-index layers preferably alternate. Particular preference is given to layer packages comprising a high-refractive-index layer and a low-refractive-index layer, where one or more of these layer packages may be applied to the support. The sequence of the high- and low-refractive-index layers can be matched to the support in order to incorporate the support into the multi-layered structure. In a further embodiment, the metal oxide, metal oxide hydrate, metal suboxide, metal, metal fluoride, metal nitride, metal oxynitride layers can be mixed or doped with colorants. Suitable colorants or other elements are, for example, organic or inorganic coloured pigments, such as coloured metal oxides, for example magnetite, chromium oxide or coloured pigments such as, for example, Berlin Blue, ultramarine, bismuth vanadate, Thenard's Blue, or alternatively organic coloured pigments, such as, for example, indigo, azo pigments, phthalocyanines or also Carmine Red, or elements, such as, for example, yttrium or antimony. Effect pigments comprising these layers exhibit high colour variety with respect to their mass tone and can in many cases exhibit an angle-dependent change in the colour (colour flop) due to interference.

In a preferred embodiment, the outer layer on the support is a high-refractive-index metal oxide. This outer layer may additionally be on the above-mentioned layer packages or, in the case of high-refractive-index supports, be part of a layer package and can consist, for example, of $TiO_2$, titanium suboxides, $Fe_2O_3$, $Fe_3O_4$, $SnO_2$, ZnO, $ZrO_2$, $Ce_2O_3$, CoO, $Co_3O_4$, $V_2O_5$, $Cr_2O_3$ and/or mixtures thereof, such as, for example, ilmenite or pseudobrookite. $TiO_2$ is particularly preferred, furthermore $Fe_2O_3$, and mixtures of $TiO_2$ and $Fe_2O_3$. If the support flakes are coated with $TiO_2$, the $TiO_2$ is preferably in the rutile modification, furthermore in the anatase modification.

Particularly preferred effect pigments have the following structure:
substrate flake+$(SiO_2)$+$TiO_2$ (rutile)
substrate flake+$(SiO_2)$+$Fe_2O_3$
substrate flake+$(SiO_2)$+$Fe_3O_4$
substrate flake+$(SiO_2)$+$SiO_2$+$TiO_2$ (rutile)
substrate flake+$(SiO_2)$+$TiO_2$ (rutile)+$SiO_2$+$TiO_2$ (rutile)
substrate flake+$(SiO_2)$+$TiO_2$ (anatase)+$SiO_2$+$TiO_2$ (anatase)
substrate flake+$(SiO_2)$+$TiO_2$/$Fe_2O_3$+$SiO_2$+$TiO_2$+$TiO_2$/$Fe_2O_3$
substrate flake+$(SiO_2)$+$TiO_2$/$Fe_2O_3$+$SiO_2$+$TiO_2$/$Fe_2O_3$.

An $SiO_2$ layer may optionally be applied to the substrate flake as a protective layer. If the substrate flake is a glass flake, it is frequently advisable to apply an $SiO_2$ layer in order to protect the glass flake against leaching-out during wet-chemical coating.

In this patent application, "high-refractive-index" means a refractive index of ≥1.8, while "low-refractive-index" means a refractive index of <1.8.

The thickness of the metal oxide, metal oxide hydrate, metal suboxide, metal, metal fluoride, metal nitride, metal oxynitride layers or a mixture thereof is usually 3 to 300 nm and, in the case of the metal oxide, metal oxide hydrate, metal suboxide, metal fluoride, metal nitride, metal oxynitride layers or a mixture thereof, preferably 20 to 200 nm. The thickness of the metal layers is preferably 4 to 50 nm.

The size of the supports and thus of the effect pigments is not crucial per se. Flake-form supports and/or flake-form supports coated with one or more transparent or semi-transparent metal oxide, metal or metal fluoride layers generally have a thickness of between 0.05 and 5 µm, in particular between 0.1 and 4.5 µm. The length and width dimensions are usually between 1 and 250 µm, preferably between 2 and 200 µm and in particular between 2 and 100 µm.

Very particularly preferred effect pigments have the following layer structure:
mica flake+$TiO_2$
mica flake+$TiO_2$+$Fe_2O_3$
mica flake+$TiO_2$/$Fe_2O_3$
mica flake+$Fe_2O_3$
mica flake+$Fe_3O_4$
mica flake+titanium oxynitrides
mica flake+$TiO_2$+$SiO_2$+$TiO_2$
mica flake+$TiO_2$/$Fe_2O_3$
mica flake+$TiO_2$/$Fe_2O_3$+$SiO_2$+$TiO_2$
mica flake+$TiO_2$/$Fe_2O_3$+$SiO_2$+$TiO_2$/$Fe_2O_3$
mica flake+$TiO_2$/$Fe_2O_3$+$SiO_2$+$TiO_2$+$TiO_2$/$Fe_2O_3$
mica flake+$TiO_2$+$SiO_2$+$TiO_2$/$Fe_2O_3$
mica flake+$TiFe_2O_5$
$Al_2O_3$ flake+$TiO_2$
$Al_2O_3$ flake+$Fe_2O_3$
$Al_2O_3$ flake+titanium oxynitrides
$SiO_2$ flake+$TiO_2$
$SiO_2$ flake+$Fe_2O_3$
$SiO_2$ flake+titanium oxynitrides
glass flake+$TiO_2$
glass flake+$Fe_2O_3$
glass flake+$TiO_2$+$Fe_2O_3$
glass flake+$SiO_2$+$TiO_2$
glass flake+$SiO_2$+$Fe_2O_3$
glass flake+$SiO_2$+$TiO_2$+$Fe_2O_3$
glass flake+$SiO_2$+$TiO_2$+$SiO_2$
glass flake+$TiO_2$+$SiO_2$+$TiO_2$
glass flake+$TiO_2$/$Fe_2O_3$
glass flake+$TiO_2$/$Fe_2O_3$+$SiO_2$+$TiO_2$
glass flake+$TiO_2$/$Fe_2O_3$+$SiO_2$+$TiO_2$/$Fe_2O_3$
glass flake+$TiO_2$/$Fe_2O_3$+$SiO_2$+$TiO_2$+$TiO_2$/$Fe_2O_3$
glass flake+$TiO_2$+$SiO_2$+$TiO_2$/$Fe_2O_3$
glass flake+$TiFe_2O_5$
glass flake+$SiO_2$+$TiO_2$/$Fe_2O_3$
glass flake+$SiO_2$+$TiO_2$/$Fe_2O_3$+$SiO_2$+$TiO_2$
glass flake+$SiO_2$+$TiO_2$/$Fe_2O_3$+$SiO_2$+$TiO_2$/$Fe_2O_3$
glass flake+$SiO_2$+$TiO_2$/$Fe_2O_3$+$SiO_2$+$TiO_2$+$TiO_2$/$Fe_2O_3$
glass flake+$SiO_2$+$TiO_2$+$SiO_2$+$TiO_2$/$Fe_2O_3$
glass flake+$SiO_2$+$TiFe_2O_5$
$Fe_2O_3$ flake+$TiO_2$
$Fe_2O_3$ flake+$Fe_2O_3$
$Fe_2O_3$ flake+titanium oxynitrides
metal flake (optionally passivated)+$TiO_2$
metal flake (optionally passivated)+$Fe_2O_3$.

$TiO_2$/$Fe_2O_3$ means that $TiO_2$ and $Fe_2O_3$ are present in a layer as a mixture and/or as a mixed oxide in the form of pseudobrookite. The pseudobrookite or $TiO_2$/$Fe_2O_3$ mixed layer may optionally also be doped with $Al_2O_3$.

Suitable effect pigments are commercially available, for example from BASF Corp., for example under the trade names Firemist®, Rightfit™, Magnapearl®, from Merck KGaA under the trade names Iriodin®, Miraval®, Xirallic® and Colorstream®.

In this patent application, effect pigments are taken to mean, for example, pearlescent pigments, interference pigments, metal-effect pigments, multilayered pigments having one or more transparent, semi-transparent layers, or opaque layers, goniochromatic pigments, holographic pigments, coated BiOCl flakes, uncoated BiOCl flakes, and LCP pigments, and mixtures thereof.

In order additionally to increase the light, water and weather stability of the pigments, it is frequently advisable to subject the effect pigment, depending on the area of application, to post-coating or post-treatment. Suitable post-coatings or post-treatments are, for example, the processes described in DE patent 22 15 191, DE-A 31 51 354, DE-A 32 35 017 or DE-A 33 34 598. This post-coating further increases the chemical stability or simplifies handling of the pigment, in particular incorporation into various media. In order to improve the wettability, dispersibility and/or compatibility with the application media, functional coatings comprising $Al_2O_3$ or $ZrO_2$ or mixtures or mixed phases thereof can be applied to the pigment surface. Furthermore, organic or combined organic/inorganic post-coatings are possible, for example with silanes, as described, for example, in EP 0090259, EP 0 634 459, WO 99/57204, WO 96/32446, WO 99/57204, U.S. Pat. No. 5,759,255, U.S. Pat. No. 5,571,851, WO 01/92425 or in J. J. Ponjeé, Philips Technical Review, Vol. 44, No. 3, 81 ff. and P. H. Harding J. C. Berg, 3. Adhesion Sci. Technol., Vol. 11, No. 4, pp. 471-493.

The proportion by weight of the flake-form effect pigments in the pigment granules according to the invention is generally between 0.1 and 50% by weight, preferably between 0.5 and 30% by weight, very particularly preferably between 1 and 10% by weight, based on the pigment granules. The optimum proportions can easily be determined by the person skilled in the art and essentially depend on the particle size of the effect pigments employed, the form factor of the effect pigments and the type of pigment structure.

Particularly preferred pigment granules according to the invention comprise 0.1-50% by weight of one or more effect pigments,
50-99.5% by weight of support material,
0.05-20% by weight of adhesion promoter,
0.05-10% by weight of additives, based on the pigment granule recipe as a whole, where the total proportion of all components in the pigment granules is ≤100% by weight.

For reasons of economy, preference is given to effect granules which comprise the lowest possible proportion (<10% by weight) of the relatively expensive effect pigments and a high proportion (>50% by weight) of inexpensive support material. This preferred embodiment is interesting, in particular, in the case of scatter application of the granules to effect wallcoverings.

However, it is necessary to use sufficient support material in order to ensure the desired properties of the pigment granules according to the invention, such as, for example, non-dusting and/or improved flowability. To this end, the polymer particles must not only be sheathed with the effect pigment, but must also be bonded to one another to form a readily flowable coarse "powder".

In a further embodiment, the pigment granules according to the invention may comprise further additives, as are usual for use in application media from the areas of paints, coatings, powder coatings, plastics. Additives and/or assistants of this type can be lubricants, release agents, stabilisers, antistatics, flameproofing agents, antioxidants, colorants, such as, for example, dyes, inorganic coloured pigments and/or organic coloured pigments, flexibilisers, plasticisers, such as, for example, diisononyl phthalate, adhesion promoters, blowing agents, antioxidants, UV absorbers, inorganic fillers and/or surfactants, organic polymer-compatible solvents and/or surfactants, phenol derivatives, mineral oils. An overview of the additives and assistants which can be employed is given in Saechtling, Kunststoff Taschenbuch [Plastics Pocketbook], 27th Edition, Carl Hanser Verlag, or is given by R. Wolf in "Plastics, Additives" in Ullmann's Encyclopaedia of Industrial Chemistry, Internet edition, 7th Edition, 2003.

The pigment granules according to the invention particularly preferably comprise wetting agents, for example silicones, silanes and/or fluoro-surfactants.

The pigment granules according to the invention can be produced relatively easily. Possible production processes which may be mentioned are gentle mixing of the individual components—effect pigment(s), support material, adhesion promoter—and subsequent rotogranulation. In this case, the components to be mixed are mixed using a mixer, in which the support material, the adhesion promoter and optionally additives and the effect pigment or the mixture of effect pigments and optionally further organic and/or inorganic pigments are mixed. In the next step, the granules are rounded to the intended particle size on a horizontally rotating pelletising pan. Finally, the crude granules are dried gently in a turbulent bed, for example in a fluidised-bed or turbulent-bed drier. However, performance in a turbulent-bed drier is preferred.

The sequence of addition of effect pigment, adhesion promoter and support material is variable and can also be carried out, for example, in such a way that the effect pigment is initially introduced and subsequently mixed with the adhesion promoter, the support material and optionally additives. This procedure is particularly preferred.

It is likewise possible to initially introduce the effect pigment, the support material and optionally additives and subsequently to add the adhesion promoter.

The invention also relates to a process for the production of the pigment granules according to the invention which is distinguished by the fact that one or more flake-form effect pigments, the support material(s), at least one adhesion promoter and optionally one or more additives are mixed simultaneously or successively with one another.

The pigment granules according to the invention are distinguished by the fact that they are abrasion-resistant, dimensionally stable and have a uniform colour effect.

In this application, the term "granules" is taken to mean all solid particle shapes which are conceivable to the person skilled in the art, such as, for example, pellets, briquettes, pearlets, sausages or the tabletted form. The particle sizes of the granules are preferably in the range from 0.05 to 150 mm, in particular 0.1 to 20 mm and very particularly preferably in the range from 0.1 to 6 mm.

The granules according to the invention preferably comprise 0.1-50% by weight, preferably 1-40% by weight, of effect pigments
0.05-20% by weight, preferably 0.5-10% by weight, of adhesion promoter
50-99.5% by weight, preferably 60-95% by weight, of support material and optionally
up to 10% by weight, based on the pigment granules, of additives, fillers, dyes and/or coloured pigments which are usual in the plastics and/or coatings sector, where the total proportion of all components is ≤100% by weight.

The coating process produces a structure of the flake-form effect pigments (or mixtures) employed in the finished granules which is directed in such a way that the low pigment loading noted in the invention achieves similar effects which the granules from the prior art otherwise produce with effect-pigment contents >50%.

The pigment granules according to the invention are particularly suitable as scatter granules, for example for PVC plastisols, in aqueous and solvent-containing polyurethane (PU) adhesives, and in aqueous and solvent-containing acrylate adhesives, where they can be bonded firmly, for example, to wallcoverings made from paper, nonwoven, PVC foam or textile.

For wallcovering application, it is possible to initially introduce an adhesive primer, onto which the effect granules are scattered. For uniform application, a metering device has proven advantageous. The effect granules are applied via a sieve selected in accordance with the desired particle diameters.

The partial or full-area application of the pigment granules according to the invention to PVC plastisols which are usual in the wallcoverings industry as primer, such as, for example, Folcosol K-RSD 5048 transparent or Folcosol S-RSD 2067/9 smooth foam (manufacturer: Folmann, Munich), produces decorative wallcoverings.

The present invention also relates to the use of the pigment granules according to the invention in paints, coatings, printing inks, plastics, and as scatter granules, for example for wallcoverings, and to the use in hydraulically curing effect plaster systems.

The present invention furthermore relates to the use of the pigment granules according to the invention in plastic applications, in particular rotational moulding. The firm anchoring of the pigments to the support material via the adhesion promoter enables the effect pigments in the polymer matrix to migrate to the surface of the workpiece (i.e., plastic) during the melting process and rotation of the workpiece, which can take 20-40 min., depending on the complexity of the workpiece.

EXAMPLES

The following examples are intended to explain the invention in greater detail, but without limiting it.

Example 1

Support Material: PVAC Particles

For the production of the pigment granules according to the invention, homogeneous mixing must be ensured. The mixture is prepared with the aid of an Eirich R02 mixer.

1000 g of Vinnaperl 10 (PVAC particles having a particle size of 0.5-1 mm from Wacker-Chemie) and 60 g of Iriodin® 305 (multilayered pigment from Merck; $TiO_2$-, $Fe_2O_3$- and $SiO_2$-coated mica flakes) are initially introduced in a mixing vessel and mixed (pan/fluidiser). 55 g of Michem Prime 4990 R (35% EAA emulsion from Michelman Inc.) are then added slowly. The mixture is subsequently mixed homogeneously (pan/fluidiser).

The moist pigment/polymer/plastic mixture prepared in this way is pelletised in an Eirich TR 04 pelletising pan, where the size distribution is also established.

To this end, 200 g of freshly produced granules are placed on the pan, and the target particle size is established at 200-350 rpm and a tilt angle of 30-40°. When the target particle size has become established, the introduction of the total amount of the water-moist pigment/polymer/plastic batch in portions is begun.

The target size is controlled, in particular, by the dimensions (size in mm) of the plastic granules employed and is intended to grow to 2±0.5 mm in the pre-specified experiment.

Portions of between 50 and 100 g are introduced here within a short time (1 kg about 10-15 min). Relatively large aggregates accumulate in the centre of the "material-flow kidney" formed during pelletisation. These are taken up using a small shovel, comminuted by hand and re-added.

The moist, granulated mixture is dried for 10-60 min. at 40-60° C. in a fluidised-bed drier. The granules produced in this way are protectively classified via a sieve having a mesh width of 3.55 mm.

The pigment granules obtained are abrasion-resistant, dimensionally stable and have extraordinary purity of the pearl effect produced.

Example 2

Support Material: Solid Glass Beads

For the production of the pigment granules according to the invention, homogeneous mixing must be ensured. The mixture is prepared with the aid of an Eirich R02 mixer.

985 g of Vialux SB 20 (solid glass beads having a particle size of 0.6-1.4 mm from Sovitec GmbH) and 10.0 g of Iriodin® 305 are initially introduced in a mixing vessel and mixed (pan/fluidiser). 5 g of Michem Prime 4983 R (25% EAA emulsion from Michelman Inc.) are then added. The mixture is subsequently mixed homogeneously (pan/fluidiser).

The moist pigment/polymer/glass beads mixture prepared in this way is pelletised in an Eirich TR 04 pelletising pan, where the size distribution is also established. To this end, 200 g of freshly produced granules are placed on the pan, and the target particle size is established at 200-350 rpm and a tilt angle of 30-40°. When the target particle size has become established, the introduction of the total amount of the water-moist effect pigment/polymer/plastic batch in portions is begun.

The target size is controlled, in particular, by the dimensions (size in mm) of the glass beads employed and is intended to grow to 2±0.5 mm in the pre-specified experiment. Portions of between 50 and 100 g are introduced here within a short time (1 kg about 10-15 min). Relatively large aggregates accumulate in the centre of the "material-flow kidney" formed during pelletisation. These are taken up using a small shovel, comminuted by hand and re-added.

The moist, granulated mixture is dried for 10-60 min. at 40-60° C. in a fluidised-bed drier. The granules produced in this way are protectively classified via a sieve having a mesh width of 3.55 mm.

The pigment granules obtained are abrasion-resistant, dimensionally stable and have extraordinary purity of the pearl effect produced.

Example 3

Alkali-Resistant Coating—Support Material: PE Particles

For the production of the pigment granules according to the invention, homogeneous mixing must be ensured. The mixture is prepared with the aid of an Eirich R02 mixer.

1000 g of Escorene LL6101 XR (LLD-PE plastic (LLD: linear low-density) from ExxonMobil) having a particle size of 3-5 mm and 53.0 g of Iriodin® 305 are initially introduced in a mixing vessel and mixed (pan/fluidiser). 36 g of Trapylen 6700 W (30% chlorinated PP dispersion from Tramaco) are then added slowly. The mixture is subsequently mixed homogeneously (pan/fluidiser).

The moist pigment/polymer/plastic mixture prepared in this way is pelletised in an Eirich TR 04 pelletising pan, where the size distribution is also established.

To this end, 200 g of freshly produced granules are placed on the pan, and the target particle size is established at 200-350 rpm and a tilt angle of 30-40°. When the target particle size has become established, the introduction of the total amount of the water-moist effect pigment/polymer/plastic batch in portions is begun. The target size is controlled, in particular, by the dimensions (size in mm) of the plastic granules employed and is intended to grow to 5.5±0.5 mm in the pre-specified experiment. Portions of between 50 and 100 g are introduced here within a short time (1 kg about 10-15 min). Relatively large aggregates accumulate in the centre of the "material-flow kidney" formed during pelletisation. These are taken up using a small shovel, comminuted by hand and re-added.

The moist, granulated mixture is dried for 10-60 min. at 40-60° C. in a fluidised-bed drier. The granules produced in this way are protectively classified via a sieve having a mesh width of 6.5 mm.

The pigment granules obtained are abrasion-resistant, dimensionally stable and have extraordinary purity of the pearl effect produced. The effect granules produced additionally have alkali resistance in accordance with DIN EN ISO 175 (finished-part testing).

Example 4

Support Material: PE Particles

For the production of the pigment granules according to the invention, homogeneous mixing must be ensured. The mixture is prepared with the aid of an Eirich R02 mixer.

917 g of Escorene LL6101 XR (LLD-PE plastic (LLD: linear low-density) from ExxonMobil) having a particle size of 3-5 mm and 55.0 g of Iriodin® 305 are initially introduced in a mixing vessel and mixed for 2 min. at setting 1 (pan/fluidiser). 28 g of Michem Prime 4990 R (35% EAA emulsion from Michelman Inc.) are then added slowly. The mixture is subsequently mixed homogeneously (pan/fluidiser).

The moist pigment/polymer/plastic mixture prepared in this way is pelletised in an Eirich TR 04 pelletising pan, where the size distribution is also established. To this end, 200 g of freshly produced granules are placed on the pan, and the target particle size is established at 200-350 rpm and a tilt angle of 30-40°. When the target particle size has become established, the introduction of the total amount of the water-moist pigment/polymer/plastic batch in portions is begun.

The target size is controlled, in particular, by the dimensions (size in mm) of the plastic granules employed and is intended to grow to 5.5±0.5 mm in the pre-specified experiment. Portions of between 50 and 100 g are introduced here within a short time (1 kg about 10-15 min). Relatively large aggregates accumulate in the centre of the "material-flow kidney" formed during pelletisation. These are taken up using a small shovel, comminuted by hand and re-added.

The moist, granulated mixture is dried for 10-60 min. at 40-60° C. in a fluidised-bed drier. The granules produced in this way are protectively classified via a sieve having a mesh width of 6.5 mm.

The pigment granules obtained are abrasion-resistant, dimensionally stable and have extraordinary purity of the pearl effect produced.

Example 5

Support Material: Solid Glass Beads

For the production of the pigment granules according to the invention, homogeneous mixing must be ensured. The mixture is prepared with the aid of an Eirich R02 mixer.

985 g of Vialux SB 20 (solid glass beads having a particle size of 0.6-1.4 mm from Sovitec GmbH) and 10.0 g of Colorstream® Arctic Fire ($TiO_2$-coated $SiO_2$ flakes; Merck KGaA) are initially introduced in a mixing vessel and mixed (pan/fluidiser). 5 g of Michem Prime 4983 R (25% EAA emulsion from Michelman Inc.) are then added. The mixture is subsequently mixed homogeneously (pan/fluidiser).

The moist pigment/polymer/glass beads mixture prepared in this way is pelletised in an Eirich TR 04 pelletising pan, where the size distribution is also established. To this end, 200 g of freshly produced granules are placed on the pan, and the target particle size is established at 200-350 rpm and a tilt angle of 30-40°. When the target particle size has become established, the introduction of the total amount of the water-moist effect pigment/polymer/plastic batch in portions is begun.

The target size is controlled, in particular, by the dimensions (size in mm) of the glass beads employed and is intended to grow to 2±0.5 mm in the pre-specified experiment. Portions of between 50 and 100 g are introduced here within a short time (1 kg about 10-15 min). Relatively large aggregates accumulate in the centre of the "material-flow kidney" formed during pelletisation. These are taken up using a small shovel, comminuted by hand and re-added.

The moist, granulated mixture is dried for 10-60 min. at 40-60° C. in a fluidised-bed drier. The granules produced in this way are protectively classified via a sieve having a mesh width of 3.55 mm.

The pigment granules obtained are abrasion-resistant, dimensionally stable and have extraordinary purity of the pearl effect produced.

Example 6

Support Material: PE Particles

For the production of the pigment granules according to the invention, homogeneous mixing must be ensured. The mixture is prepared with the aid of an Eirich R02 mixer.

917 g of Escorene LL6101 XR (LLD-PE plastic (LLD: linear low-density) from ExxonMobil) having a particle size of 3-5 mm and 55.0 g of Iriodin® 103 ($TiO_2$-coated mica flakes; Merck KGaA) are initially introduced in a mixing vessel and mixed for 2 min. at setting 1 (pan/fluidiser). 28 g of Michem Prime 4990 R (35% EAA emulsion from Michelman Inc.) are then added slowly. The mixture is subsequently mixed homogeneously (pan/fluidiser).

The moist pigment/polymer/plastic mixture prepared in this way is pelletised in an Eirich TR 04 pelletising pan, where the size distribution is also established. To this end, 200 g of freshly produced granules are placed on the pan, and the target particle size is established at 200-350 rpm and a tilt angle of 30-40°. When the target particle size has become established, the introduction of the total amount of the water-moist pigment/polymer/plastic batch in portions is begun.

The target size is controlled, in particular, by the dimensions (size in mm) of the plastic granules employed and is intended to grow to 5.5±0.5 mm in the pre-specified experiment. Portions of between 50 and 100 g are introduced here within a short time (1 kg about 10-15 min). Relatively large aggregates accumulate in the centre of the "material-flow kidney" formed during pelletisation. These are taken up using a small shovel, comminuted by hand and re-added.

The moist, granulated mixture is dried for 10-60 min. at 40-60° C. in a fluidised-bed drier. The granules produced in this way are protectively classified via a sieve having a mesh width of 6.5 mm.

The pigment granules obtained are abrasion-resistant, dimensionally stable and have extraordinary purity of the pearl effect produced.

Example 7

Pigment Granules for Use in the Rotomoulding Process—Support Material: PE Particles The support plastic powder Borecene LLD RM 7243 (LLD-PE plastic powder from Borealis) is microgranulated to the particle diameter 0.6-1 mm by means of a perforated disc in an underwater granulation before commencement of the experiment. The measure serves to generate a uniform support surface for subsequent coating by means of effect pigments on the plastic support surface.

For the production of the pigment granules according to the invention, homogeneous mixing must be ensured. The mixture is prepared with the aid of an Eirich R02 mixer.

901 g of Borecene LLD RM 7243 microgranules (LLD-PE plastic (LLD: linear low-density) from Borealis) having a particle size of 0.5-1 mm and 28.50 g of Iriodin® 305 (pearlescent pigment from Merck) are initially introduced in a mixing vessel and mixed (pan/fluidiser). 71.5 g of Ultralaube XP-06070480 (42% LDPE emulsion from Keim-Additec) are then added slowly. The mixture is subsequently mixed homogeneously (pan/fluidiser). The moist pigment/polymer/plastic mixture prepared in this way is pelletised in an Eirich TR 04 pelletising pan, where the size distribution is also established. To this end, 200 g of freshly produced granules are placed on the pan, and the target particle size is established at 200-350 rpm and a tilt angle of 30-40°. When the target particle size has become established, the introduction of the total amount of the water-moist pigment/polymer/plastic batch in portions is begun. The target size is controlled, in particular, by the dimensions (size in mm) of the plastic granules employed and is intended to grow to 1.5-2 mm in the pre-specified experiment.

Portions of between 50 and 100 g are introduced here within a short time (1 kg about 10-15 min). Relatively large aggregates accumulate in the centre of the "material-flow kidney" formed during pelletisation. These are taken up using a small shovel, comminuted by hand and re-added.

The moist, granulated mixture is dried for 10-60 min at 40-60° C. in a fluidised-bed drier. The granules produced in this way are protectively classified via a sieve having a mesh width of 2.5 mm.

The pigment granules obtained are abrasion-resistant, dimensionally stable and have extraordinary purity of the pearl effect produced.

Example 8

Scatter Application to Wallcoverings

The above-mentioned plastisol—Folcosol RSD 2067/9 smooth foam, for example, is applied here by means of flatbed screen printing using a 27/120 screen (sold by Häusler, Erzhausen; open mesh width: 250 µm; filament thickness 120 µm) to a Tempera® VS085xENX coated wallcovering nonwoven (weight per unit area: 85 g/m$^2$) from Dresden Papier, Heidenau, Germany.

The pigment granules according to the invention from Example 1 are subsequently scattered over part or all of the surface of the plastisol Folcosol RSD 2067/9 smooth foam applied in this way, which is finally dried at 200° C., 1 min., in a drying cabinet; Heraeus; model 5050EK (nominal temperature: 300° C.) in the circulated-air method. During this process, the plastisol Folcosol S-RSD 2067/9 smooth foam expands smoothly to form a foam and fixes the pigment granules according to the invention to the Tempera® VS085xENX wallcovering nonwoven (weight per unit area: 85 g/m$^2$) from Dresden Papier.

In order to increase the adhesion, the pigment granules according to the invention are subsequently fixed into the still-plastic PVC plastisol adhesion matrix under a pressure of 0.1-5 Pa immediately after the 1-minute drying/expansion process of the plastisol at 200° C. in a drying cabinet by means of a smoothing, structuring or embossing roll.

At the drying/expansion temperature of the plastisol of 200° C., the support materials of the granules according to the invention, which have a melting point of ≤200° C., become plastic, but without the adhesion of the effect-pigment coating on the support material decreasing. It is thus possible to produce relief-like structures on the surface of the effect-granule paper or nonwoven surface. An additional advantage of embossing arises in the increase in the mechanical resistances, such as the abrasion resistance of the effect-granule surface produced.

Although the invention is described herein with reference to specific embodiments, the invention is not intended to be limited to the details shown. Rather, various modifications may be made in the details within the scope and range of equivalents of the claims and without departing from the invention.

The invention claimed is:

1. Pigment granules comprising a support material which is coated with one or more flake-form effect pigments by means of an adhesion promoter,
    wherein the one or more flake-form effect pigments comprise a flake-form support coated with one or more layers selected from the group consisting of transparent layers, semitransparent layers, opaque layers, and a combination thereof,
    wherein the support material is a polymer particle, a solid glass bead, a hollow glass bead, or mixtures thereof, and have particle sizes of 0.05-50 mm, and
    wherein the adhesion promoter comprises an emulsion selected from the group consisting of an ethylene-acrylic acid (EAA) emulsion, a low-chlorinated polypropylene emulsion, a non-chlorinated polypropylene emulsion, and a wax emulsion, wherein the granules comprise:
    0.1-50% by weight of the one or more effect pigments,
    50-99.5% by weight of the support material,
    0.1-10% by weight of the adhesion promoter, and
    0.05-10% by weight of one or more additives,
    based on the pigment granules, where the total proportion of all components in the pigment granules is 100% by weight.

2. The pigment granules according to claim 1, wherein the one or more effect pigments are selected from the group consisting of pearlescent pigments, interference pigments, metal-effect pigments, multilayered pigments, and mixtures thereof.

3. The pigment granules according to claim 1, wherein the support material is a polymer particle and the polymer particle is selected from the group consisting of polyolefins, polystyrene (PS), polymethyl methacrylate (PMMA), polyethylene terephthalate (PET), polycarbonate (PC), polyvinyl acetate copolymer (PVAC), ethylene-acrylic acid copolymer (EAA), ethylene-vinyl acetate copolymer (EVA), and polylactic acid (PLA).

4. The pigment granules according to claim 1, wherein the support material is a polymer particle and the polymer particle consists of EAA, EVA, or polyvinyl acetate copolymer (PVAC).

5. The pigment granules according to claim 1, wherein the support material has particle sizes of 0.05-50 mm.

6. The pigment granules according to claim 1, wherein a proportion of the adhesion promoter, based on the pigment granules, is 0.15-5% by weight.

7. The pigment granules according to claim 1, wherein the pigment granules comprise one or more additives selected from the group consisting of lubricants, wetting agents, and antioxidants.

8. The pigment granules according to claim 1, wherein the pigment granules additionally comprise one or more of the group consisting of inorganic fillers, dyes, and coloured pigments.

9. A process for the production of pigment granules comprising mixing one or more flake-form effect pigments, a support material, at least one adhesion promoter, and optionally one or more additives simultaneously or successively with one another, wherein the one or more flake-form effect pigments comprise a flake-form support coated with one or more layers selected from the group consisting of transparent layers, semitransparent layers, opaque layers, and a combination thereof,
wherein the support material is a polymer particle, a solid glass bead, a hollow glass bead, or mixtures thereof, and have particle sizes of 0.05-50 mm,
wherein the adhesion promoter comprises an emulsion selected from the group consisting of an ethylene-acrylic acid (EAA) emulsion, a low-chlorinated polypropylene emulsion, a non-chlorinated polypropylene emulsion, and a wax emulsion,
wherein the granules comprise:
0.1-50% by weight of the one or more effect pigments,
50-99.5% by weight of the support material,
0.1-10% by weight of the adhesion promoter, and
0.05-10% by weight of one or more additives,
based on the pigment granules, where the total proportion of all components in the pigment granules is 100% by weight.

10. A method for the pigmenting of application media comprising incorporating pigment granules with paints, coatings, powder coatings, plastics, textiles, or effect plaster systems, wherein the pigment granules comprise a flake-form support material which is coated with one or more flake-form effect pigments by means of an adhesion promoter,
wherein the one or more flake-form effect pigments comprise a flake-form support coated with one or more layers selected from the group consisting of transparent layers, semitransparent layers, opaque layers, and a combination thereof,
wherein the support material is a polymer particle, a solid glass bead, a hollow glass bead, or mixtures thereof, and have particle sizes of 0.05-50 mm,
wherein the adhesion promoter comprises an emulsion selected from the group consisting of an ethylene-acrylic acid (EAA) emulsion, a low-chlorinated polypropylene emulsion, a non-chlorinated polypropylene emulsion, and a wax emulsion,
wherein the granules comprise:
0.1-50% by weight of the one or more effect pigments,
50-99.5% by weight of the support material,
0.1-10% by weight of the adhesion promoter, and
0.05-10% by weight of one or more additives,
based on the pigment granules, where the total proportion of all components in the pigment granules is 100% by weight.

11. The method according to claim 10, wherein the application media is a plastic of a rotational moulding process.

12. The pigment granules according to claim 1, wherein the support material is a solid glass bead, a hollow glass bead, or mixtures thereof.

13. The pigment granules according to claim 1, wherein the support material comprises one or more mixtures of materials selected from the group consisting of: solid glass beads and hollow glass beads; solid glass beads and thermoplastics; solid glass beads and thermosets; thermoplastics, thermosets, and solid glass beads; hollow glass beads and thermoplastics; hollow glass beads and thermosets; thermoplastics, thermosets, and hollow glass beads; and thermoplastics and thermosets.

14. The pigment granules of claim 1, wherein the one or more flake-form effect pigments comprises one or more structures selected from the group consisting of:
substrate flake+$(SiO_2)$+$TiO_2$ (rutile);
substrate flake+$(SiO_2)$+$Fe_2O_3$;
substrate flake+$(SiO_2)$+$Fe_3O_4$;
substrate flake+$(SiO_2)$+$SiO_2$+$TiO_2$ (rutile);
substrate flake+$(SiO_2)$+$TiO_2$ (rutile)+$SiO_2$+$TiO_2$ (rutile);
substrate flake+$(SiO_2)$+$TiO_2$ (anatase)+$SiO_2$+$TiO_2$ (anatase);
substrate flake+$(SiO_2)$+$TiO_2/Fe_2O_3$+$SiO_2$+$TiO_2$+$TiO_2/Fe_2O_3$;
substrate flake+$(SiO_2)$+$TiO_2/Fe_2O_3$+$SiO_2$+$TiO_2/Fe_2O_3$;
mica flake+$TiO_2$;
mica flake+$TiO_2$+$Fe_2O_3$;
mica flake+$TiO_2/Fe_2O_3$;
mica flake+$Fe_2O_3$;
mica flake+$Fe_3O_4$;
mica flake+titanium oxynitrides;
mica flake+$TiO_2$+$SiO_2$+$TiO_2$;
mica flake+$TiO_2/Fe_2O_3$;
mica flake+$TiO_2/Fe_2O_3$+$SiO_2$+$TiO_2$;
mica flake+$TiO_2/Fe_2O_3$+$SiO_2$+$TiO_2/Fe_2O_3$;
mica flake+$TiO_2/Fe_2O_3$+$SiO_2$+$TiO_2$+$TiO_2/Fe_2O_3$;
mica flake+$TiO_2$+$SiO_2$+$TiO_2/Fe_2O_3$;
mica flake+$TiFe_2O_5$;
$Al_2O_3$ flake+$TiO_2$;
$Al_2O_3$ flake+$Fe_2O_3$;
$Al_2O_3$ flake+titanium oxynitrides;
$SiO_2$ flake+$TiO_2$;
$SiO_2$ flake+$Fe_2O_3$;
$SiO_2$ flake+titanium oxynitrides;
glass flake+$TiO_2$;
glass flake+$Fe_2O_3$;
glass flake+$TiO_2$+$Fe_2O_3$;
glass flake+$SiO_2$+$TiO_2$;
glass flake+$SiO_2$+$Fe_2O_3$;
glass flake+$SiO_2$+$TiO_2$+$Fe_2O_3$;
glass flake+$SiO_2$+$TiO_2$+$SiO_2$;
glass flake+$TiO_2$+$SiO_2$+$TiO_2$;
glass flake+$TiO_2/Fe_2O_3$;
glass flake+$TiO_2/Fe_2O_3$+$SiO_2$+$TiO_2$;
glass flake+$TiO_2/Fe_2O_3$+$SiO_2$+$TiO_2/Fe_2O_3$;
glass flake+$TiO_2/Fe_2O_3$+$SiO_2$+$TiO_2$+$TiO_2/Fe_2O_3$;
glass flake+$TiO_2$+$SiO_2$+$TiO_2/Fe_2O_3$;
glass flake+$TiFe_2O_5$;
glass flake+$SiO_2$+$TiO_2/Fe_2O_3$;
glass flake+$SiO_2$+$TiO_2/Fe_2O_3$+$SiO_2$+$TiO_2$;
glass flake+$SiO_2$+$TiO_2/Fe_2O_3$+$SiO_2$+$TiO_2/Fe_2O_3$;
glass flake+$SiO_2$+$TiO_2/Fe_2O_3$+$SiO_2$+$TiO_2$+$TiO_2/Fe_2O_3$;
glass flake+$SiO_2$+$TiO_2$+$SiO_2$+$TiO_2/Fe_2O_3$;
glass flake+$SiO_2$+$TiFe_2O_5$;
$Fe_2O_3$ flake+$TiO_2$;
$Fe_2O_3$ flake+$Fe_2O_3$;
$Fe_2O_3$ flake+titanium oxynitrides;
metal flake (optionally passivated)+$TiO_2$; and
metal flake (optionally passivated)+$Fe_2O_3$.

* * * * *

UNITED STATES PATENT AND TRADEMARK OFFICE
CERTIFICATE OF CORRECTION

PATENT NO. : 8,883,879 B2  
APPLICATION NO. : 13/141529  
DATED : November 11, 2014  
INVENTOR(S) : Thomas Rathschlag et al.

Page 1 of 1

It is certified that error appears in the above-identified patent and that said Letters Patent is hereby corrected as shown below:

In The Claims

At Column 16, lines 50-51, "5. The pigment granules according to claim 1, wherein the support material has particle sizes of 0.05-50 mm." should be deleted.

At Column 16, line 52, claim 6 should be claim 5.

At Column 16, line 55, claim 7 should be claim 6.

At Column 16, line 59, claim 8 should be claim 7.

At Column 16, line 63, claim 9 should be claim 8.

At Column 17, line 23, claim 10 should be claim 9.

At Column 17, line 50, claim 11 should be claim 10.

At Column 17, line 50, "The method according to claim 10," should read --The method according to claim 9,--.

At Column 17, line 52, claim 12 should be claim 11.

At Column 17, line 55, claim 13 should be claim 12.

At Column 18, line 4, claim 14 should be claim 13.

Signed and Sealed this  
Twenty-first Day of July, 2015

Michelle K. Lee  
*Director of the United States Patent and Trademark Office*